Figure 9:
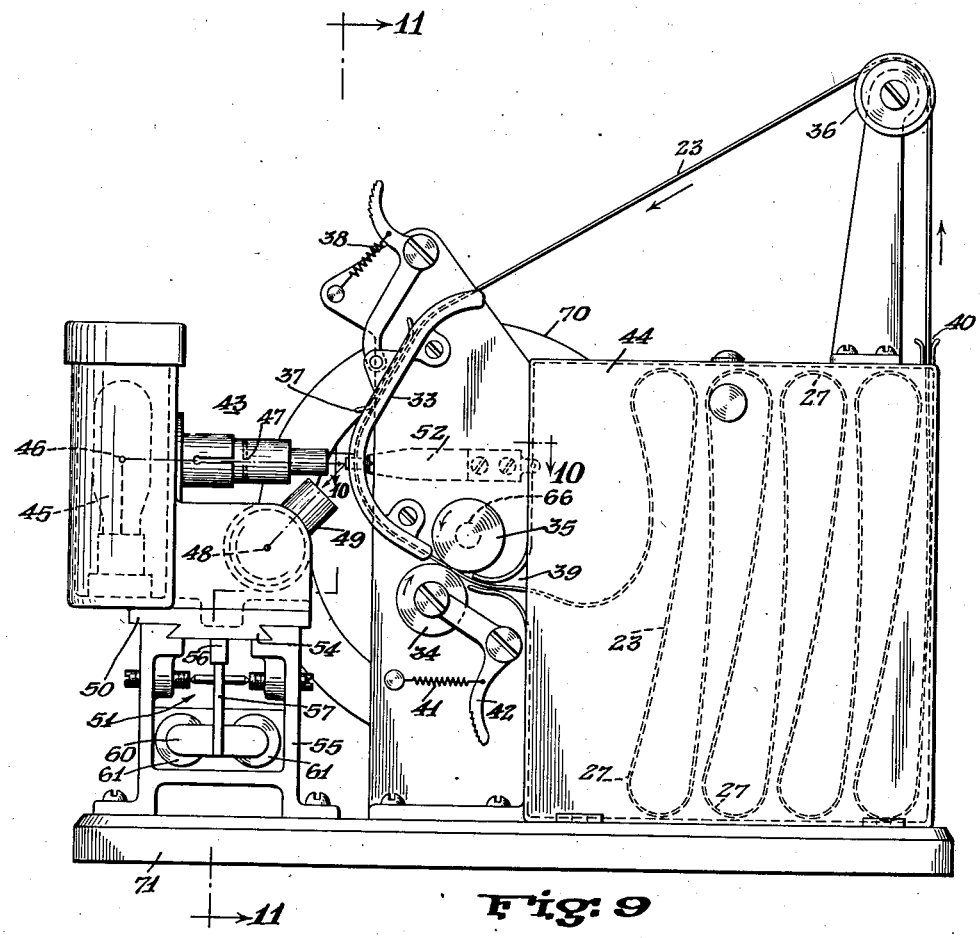

March 1, 1938.　　　　W. G. H. FINCH　　　　2,109,627
SOUND RECORDING SYSTEM
Filed Nov. 30, 1936　　　12 Sheets-Sheet 1
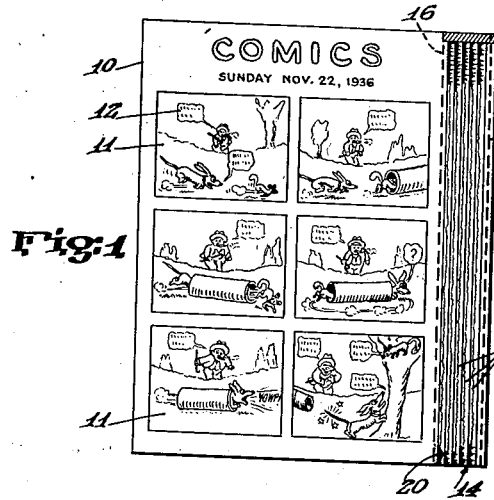
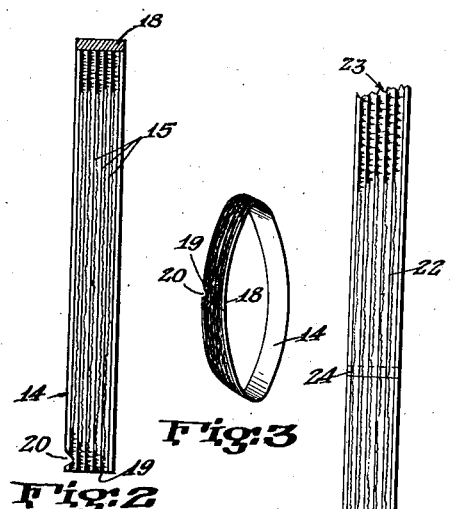
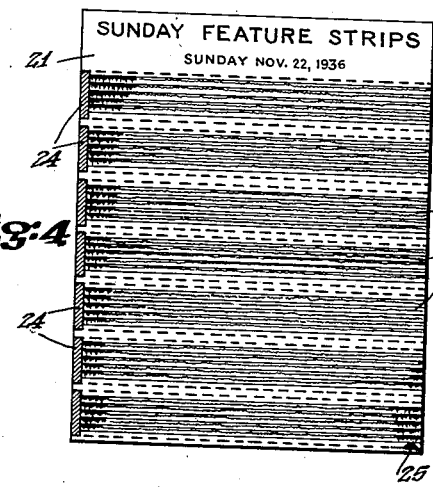
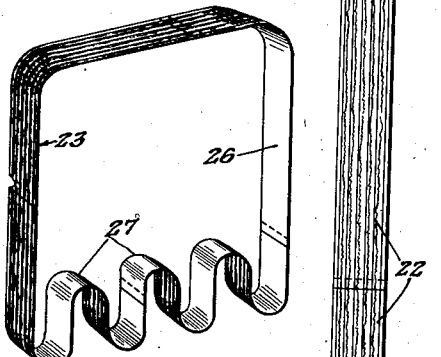
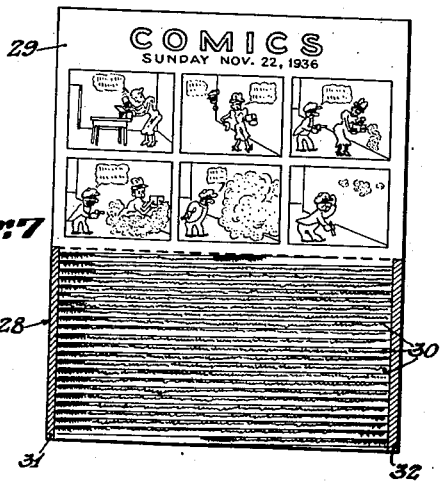
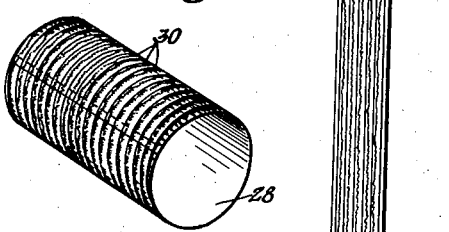
INVENTOR
William G. H. Finch
BY
ATTORNEY March 1, 1938.  W. G. H. FINCH  2,109,627
SOUND RECORDING SYSTEM
Filed Nov. 30, 1936   12 Sheets-Sheet 2

INVENTOR
William G. H. Finch
BY
ATTORNEY

March 1, 1938.     W. G. H. FINCH     2,109,627
SOUND RECORDING SYSTEM
Filed Nov. 30, 1936     12 Sheets-Sheet 4
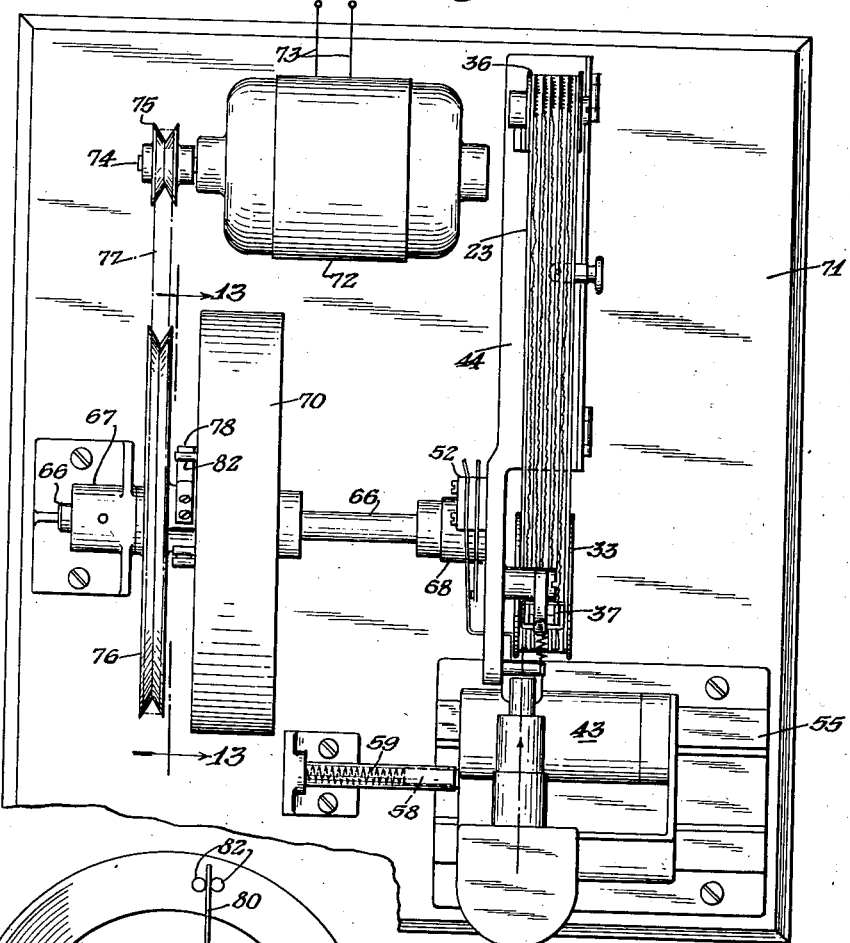
INVENTOR
William G. H. Finch
BY
ATTORNEY March 1, 1938.　　　W. G. H. FINCH　　　2,109,627
SOUND RECORDING SYSTEM
Filed Nov. 30, 1936　　　12 Sheets-Sheet 5
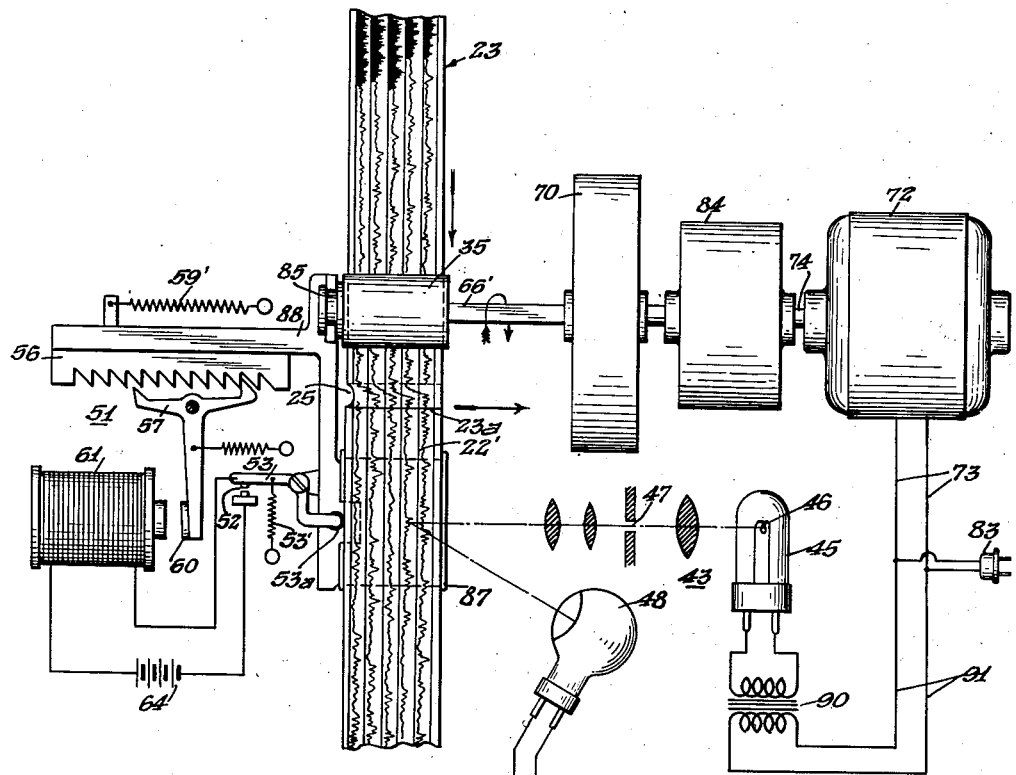
Fig. 14
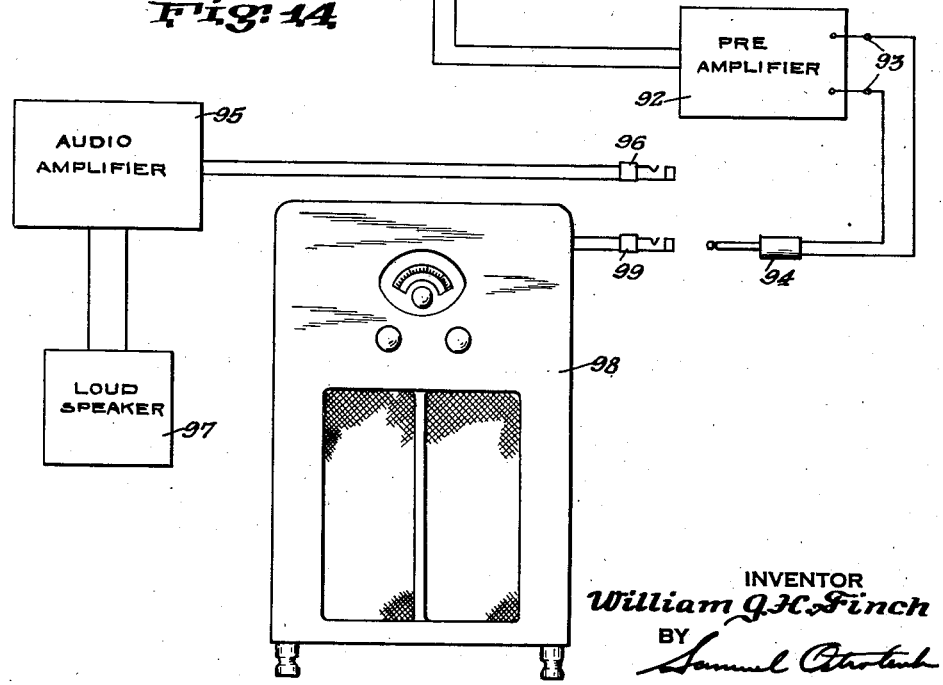
INVENTOR
William G. H. Finch
BY
ATTORNEY

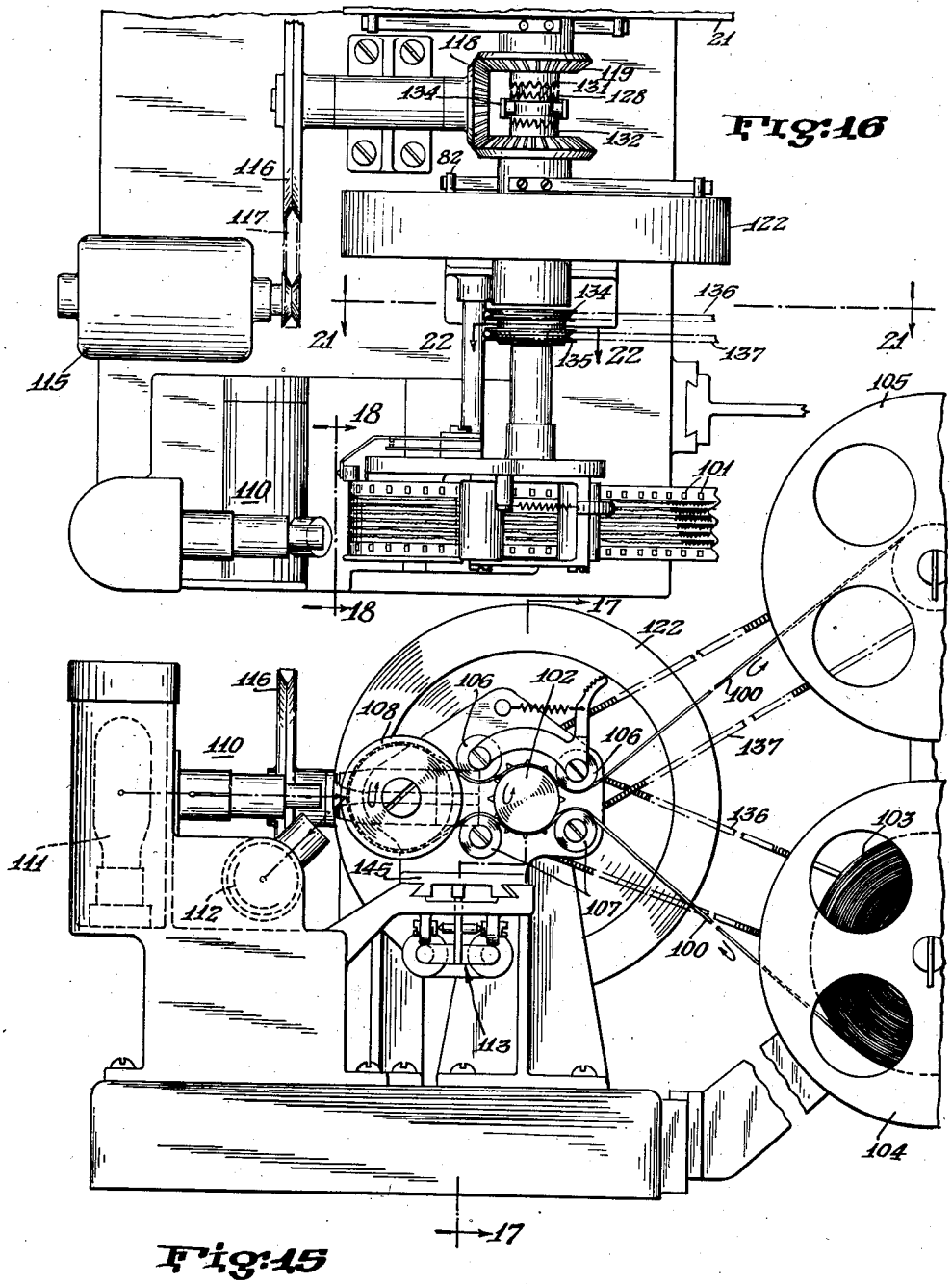

March 1, 1938.  W. G. H. FINCH  2,109,627
SOUND RECORDING SYSTEM
Filed Nov. 30, 1936  12 Sheets-Sheet 7

INVENTOR
William G. H. Finch
BY
ATTORNEY

March 1, 1938.  W. G. H. FINCH  2,109,627
SOUND RECORDING SYSTEM
Filed Nov. 30, 1936   12 Sheets-Sheet 8

INVENTOR
William G. H. Finch
BY
ATTORNEY

March 1, 1938.  W. G. H. FINCH  2,109,627
SOUND RECORDING SYSTEM
Filed Nov. 30, 1936  12 Sheets-Sheet 9

INVENTOR
William G. H. Finch
BY
Samuel Ostrolenk
ATTORNEY

INVENTOR
William G. H. Finch
BY
ATTORNEY

March 1, 1938.　　　W. G. H. FINCH　　　2,109,627
SOUND RECORDING SYSTEM
Filed Nov. 30, 1936　　　12 Sheets-Sheet 11
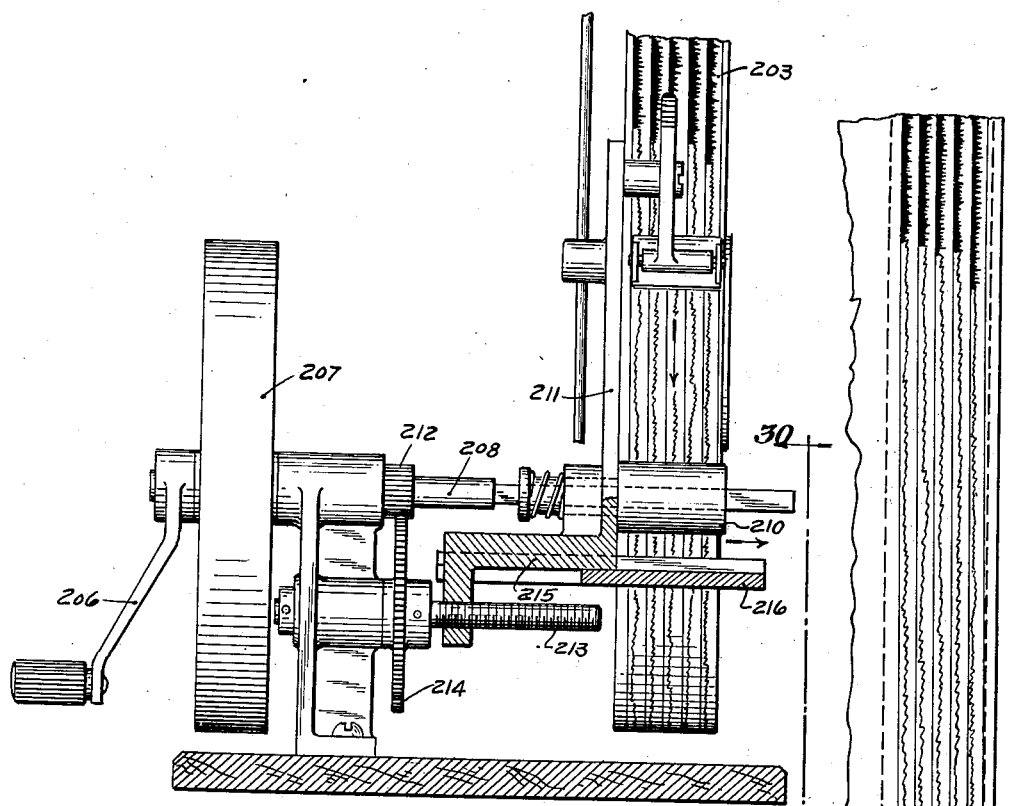
Fig. 29
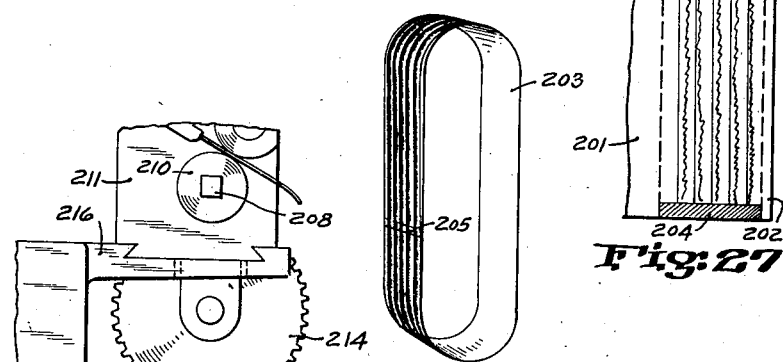
Fig. 27
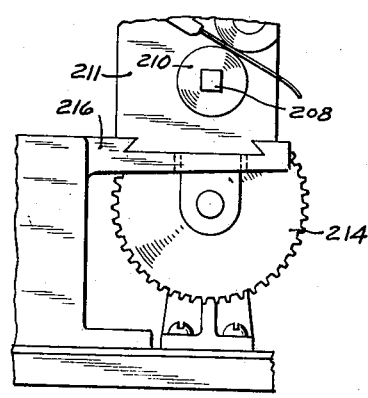
Fig. 28
Fig. 30
INVENTOR
William G. H. Finch
BY
Samuel Atwink
ATTORNEY March 1, 1938.　　　W. G. H. FINCH　　　2,109,627
SOUND RECORDING SYSTEM
Filed Nov. 30, 1936　　　12 Sheets-Sheet 12

INVENTOR
William G. H. Finch
BY
ATTORNEY

Patented Mar. 1, 1938

2,109,627

UNITED STATES PATENT OFFICE 2,109,627

SOUND RECORDING SYSTEM

William G. H. Finch, Spuyten Duyvil, Bronx County, N. Y.

Application November 30, 1936, Serial No. 113,467

15 Claims. (Cl. 179—100.3)

This invention relates to novel sound recording and reproducing systems particularly adapted to audibly portray newspaper comic and feature sections.

An important feature of modern newspapers is the comic section consisting of drawings depicting a continuity of action to form a story, usually humorous in nature. Many children regularly follow the antics of the comic characters and impose upon older people to read the expressions of these characters. My present invention is particularly directed to provide sound records printed integral with the comic sections which records may readily be inserted in a novel reproducing machine for obtaining an audible account of the comic action. The audible rendition of comic sections or other features of a newspaper in a simple and inexpensive manner greatly enhances the value of these features to individuals, particularly to children, who cannot read. Major advantages of this invention reside in the mechanical recitation of comic sections to youngsters as well as in providing them with further entertainment in the use of the accompanying mechanism.

In a preferred form of my invention, I print a strip containing a plurality of parallel sound sound tracks along an edge of the sheet containing the pictured story. The child severs this sound strip from the sheet and inserts it in one of the novel reproducing devices to be hereinafter described. The printing of the sound track strip upon the newspaper is similar to the printing operation of any picture in the paper. A zinc plate is formed from the original sound track and the steps of printing the facsimile of the sound tracks upon the sheet is similar to the well-known practise. I prefer to provide perforations upon the borders of the strip to more accurately define and simplify the removal of the strips. Although a single length of strip may be employed for reproduction of the feature, modifications are provided whereby a series of strips are attached end to end to form a continuous belt of the sound tracks. A further modification employs sound tracks arranged at an angle to the sheet which are formed into a cylindrical sheet for reproduction whereby a continuous helical scanning operation is used in the reproduction thereof. This modification may take the forms of either a strip or sheet record.

Another important use of my present invention resides in providing long reels of sound ribbon containing the plurality of parallel sound tracks for use in reading newpapers or books to blind people. The sound reel is similar to a moving picture reel except that it is much more economical to produce. The material of this reel is preferably opaque and may be paper upon which the sound tracks are printed by ordinary printing operations. The printing operation may also be performed photographically upon sensitive paper or film to accomplish the same results.

The sound records of my present invention may be used for quality acoustic reproduction including lengthy musical renditions. However, the widest utility of this invention resides in acoustically conveying intelligible speech. Accordingly, by limiting the frequency response of the apparatus to about 2200 to 2500 cycles, a slower rate of sound track scanning and simpler electro-optical design as compared to talking-moving picture apparatus will prove adequate.

The preferred scanning equipment comprises a light source focused upon the sound track and a photo-electric cell sensitive to the varying light intensities refracted from the record. A pre-amplifier consisting of one or two stages of audio frequency amplification are associated with the photo-electric cell to directly amplify the relatively weak electrical signals generated by the photo-electric cell. Although an individual amplifier and loud speaker for the reproduction equipment may be used, the cost of the apparatus may be materially decreased by connecting the output of the pre-amplifier to the audio frequency section of a radio broadcast receiver by means of a plug and jack connection.

The reproduction apparatus for the newspaper sound strips operate by frictional feeding instead of sprocket feeding. A notch is cut at a predetermined portion of the sound strip which actuates a relay for shifting the sound strip transverse to the scanning beam in order to bring the next adjacent sound track into scanning position. Where the strip is formed into an endless belt, the shifting occurs at the joint between the beginning and end of the belt. Accordingly, at the moment one sound track is completely scanned, corresponding to one revolution of the endless belt, the scanning operation is continued at the beginning of the next adjacent sound track.

A single sound strip cut from a newspaper page may contain the complete story or speech corresponding to the comic action depicted on that page. This strip may be pasted to form an endless belt which forms a plurality of adjacent continuous sound tracks. This belt is inserted in the reproducing device. A notch, cut in the strip, initiates the successive shifting operations between sound track scannings. By arranging the sound tracks at an angle to the strip, the endless belt formed of this strip will contain a continuous helical spiral connecting the individually printed parallel sound tracks. The reproducing device for such a sound strip does not require a shifting mechanism but utilizes a predetermined rate of feed for the scanning beam transverse to the sound strip. A predetermined length of the sound strip, for example equal to the standard length of a newspaper sheet, corresponds to a predetermined transverse feed rate for continuously scanning the helical sound record.

The modification of the reproducing apparatus employing a long sound reel performs a reversal of feed direction simultaneously with the track shifting operation. When one end of the reel is reached, the feeding operation is automatically reversed and the scanning continues on the next adjacent sound track. By providing an even number of sound tracks, the reel will be wound ready for re-use.

Accordingly, an object of my present invention is to provide novel methods for audibly portraying newspaper comic and feature sections.

Another object of my present invention is to provide a novel newspaper section containing printed sound records readily detached and reproducible for describing the continuity of action of a comic feature.

Still another object of my present invention is to provide novel methods of and apparatus for reproducing sound records printed on newspaper pages.

A further object of my present invention is to provide novel sound reproducing mechanism for automatically scanning a plurality of adjacent sound tracks of a sound strip.

Still a further object of my present invention is to provide simple, inexpensive reproducing apparatus for sound records primarily suitable for sound records which can be readily printed in a newspaper.

These and other objects of my present invention will become apparent in the following description taken in connection with the drawings, in which:

Figure 1 is a preferred illustration of a comic sheet containing a single sound strip printed along one edge of the sheet; Figure 2 illustrates the sound strip of Figure 1 severed from the sheet; Figure 3 shows the same strip formed into an endless belt ready to be inserted in the reproduction apparatus.

Figure 4 illustrates a newspaper sheet containing a plurality of sound strips corresponding to a special feature or story; Figure 5 illustrates how these several strips are pasted together to form a long strip with continuous sound tracks; Figure 6 illustrates a preferred manner of utilizing the long sound strip by forming an endless belt and folding the strip in a compact arrangement.

Figure 7 illustrates a modified sound record form printed upon a comic section and bearing a longer story than a single strip can contain; Figure 8 schematically illustrates how this sound chart is arranged on a cylinder and scanned in a continuous helical manner.

Figure 10:
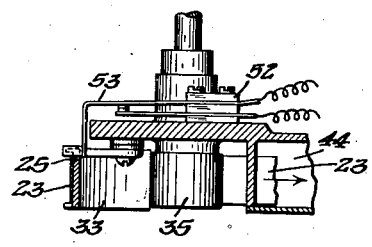
Figure 11:
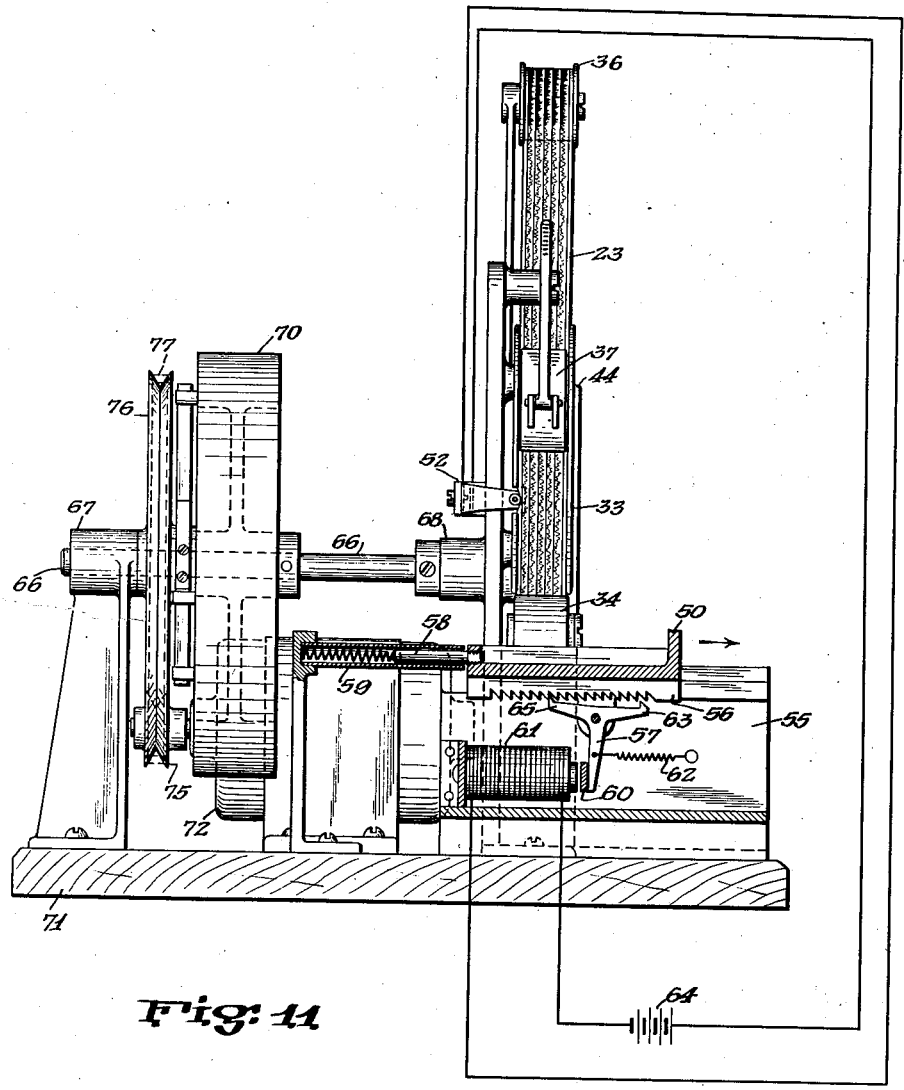

Figure 9 is an elevational view of a preferred form of apparatus for reproducing a long, endless sound strip; Figure 10 is the cross-sectional view taken along 10—10 of Figure 9, illustrating the shifting relay switch; Figure 11 is a partial cross-sectional view taken along 11—11 of Figure 9 illustrating the details of the scanner shifting mechanism; Figure 12 is a plan view of the apparatus of Figure 9; Figure 13 illustrates the elastic coupling for driving the fly-wheel to minimize strip feeding irregularities, and corresponds to the view taken along 13—13 of Figure 12.

Figure 14 is a schematic illustration of the operation of the reproducing apparatus containing a track shifting mechanism.

Figure 17:
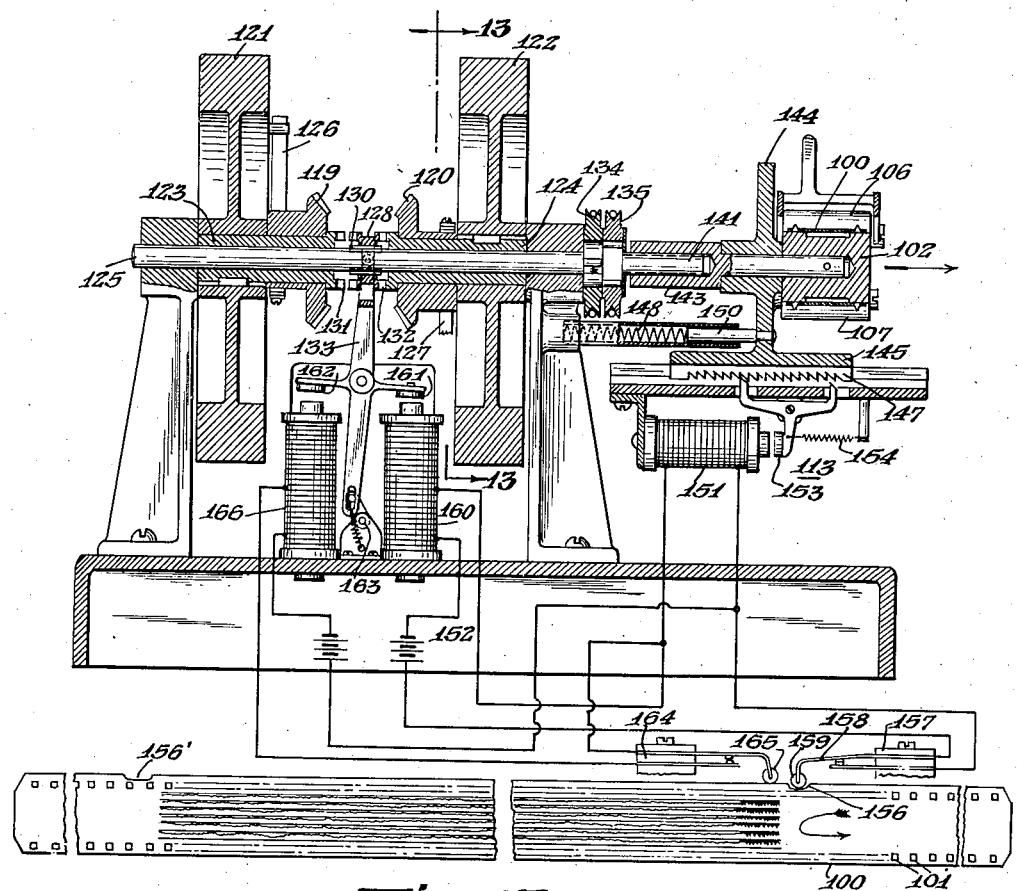
Figure 20:
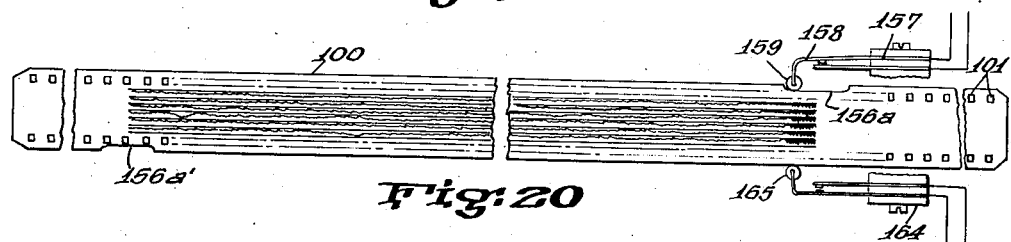
Figures 18, 19:
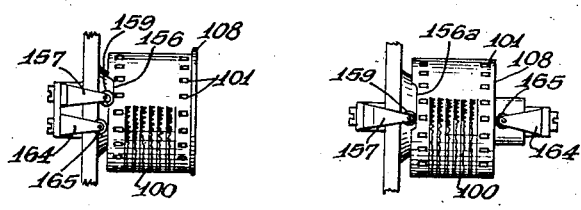
Figures 22, 24:
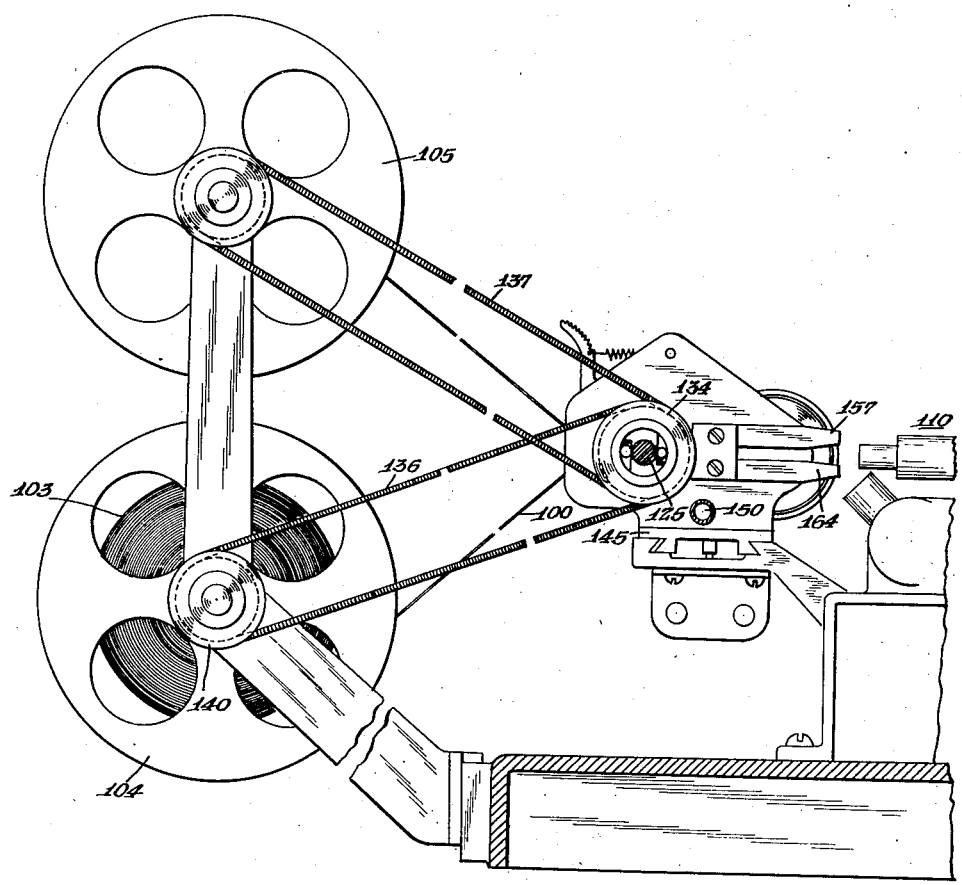

Figure 15 is an elevational view of a reproducing apparatus particularly adapted for sound reel reproduction, containing a feeding reversal mechanism; Figure 16 is a plan view of apparatus in Figure 15; Figure 17 is a cross-sectional view taken along 17—17 of Figure 15 showing details of the film reversing and shifting mechanism; Figure 18 is an end view of the film relays and corresponds to the view taken along 18—18 of Figure 16; Figure 19 is a modification of the relay arrangement corresponding to Figure 18; Figure 20 illustrates the arrangement of the relays with respect to the film for the modification of Figure 19; Figure 21 is the cross-sectional view taken along 21—21 of Figure 16, showing details of the reverse feeding drive; Figure 22 is an enlarged cross-sectional detail corresponding to the view taken along 22—22 of Figure 16.

Figure 23:
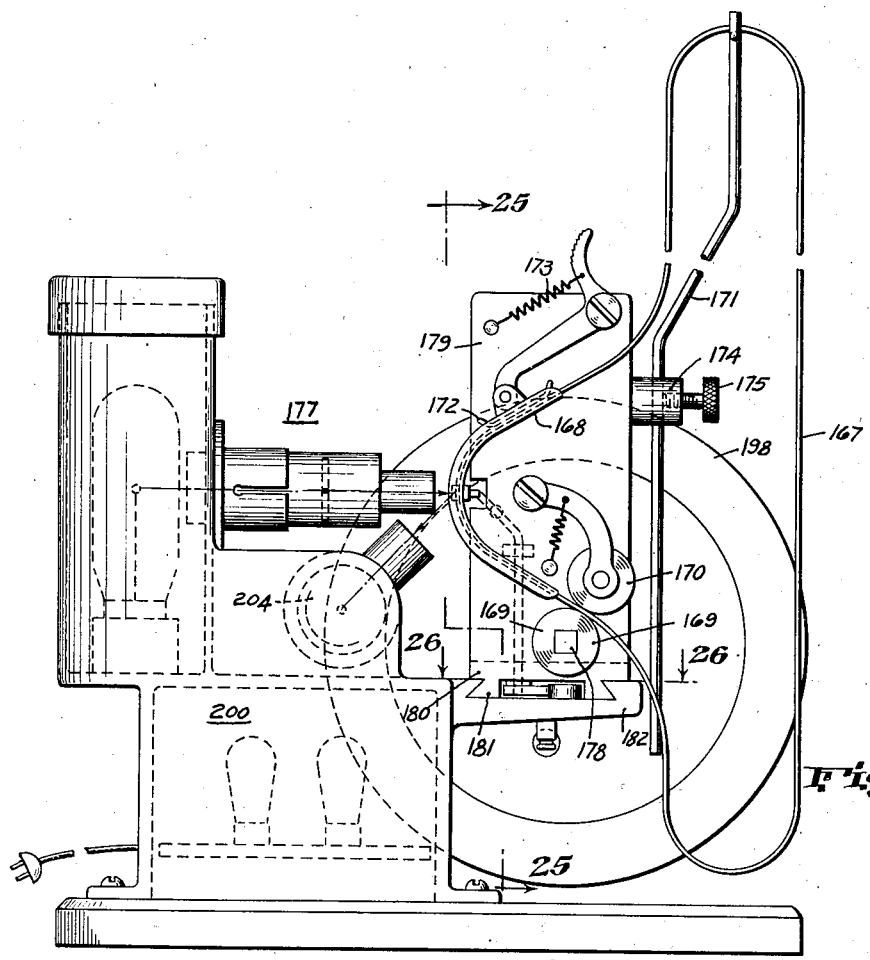
Figure 24:
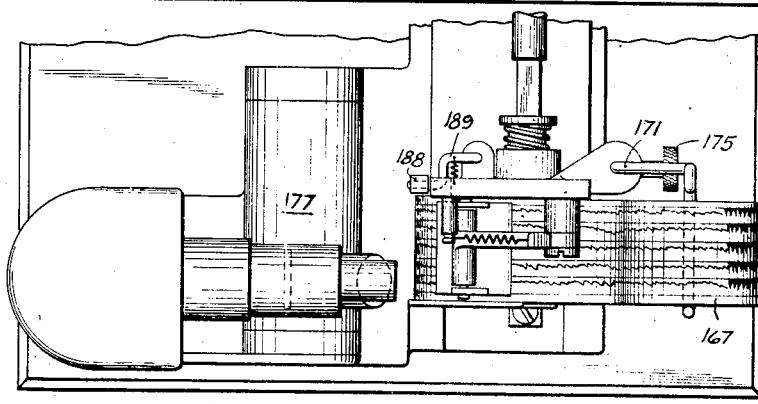
Figure 25:
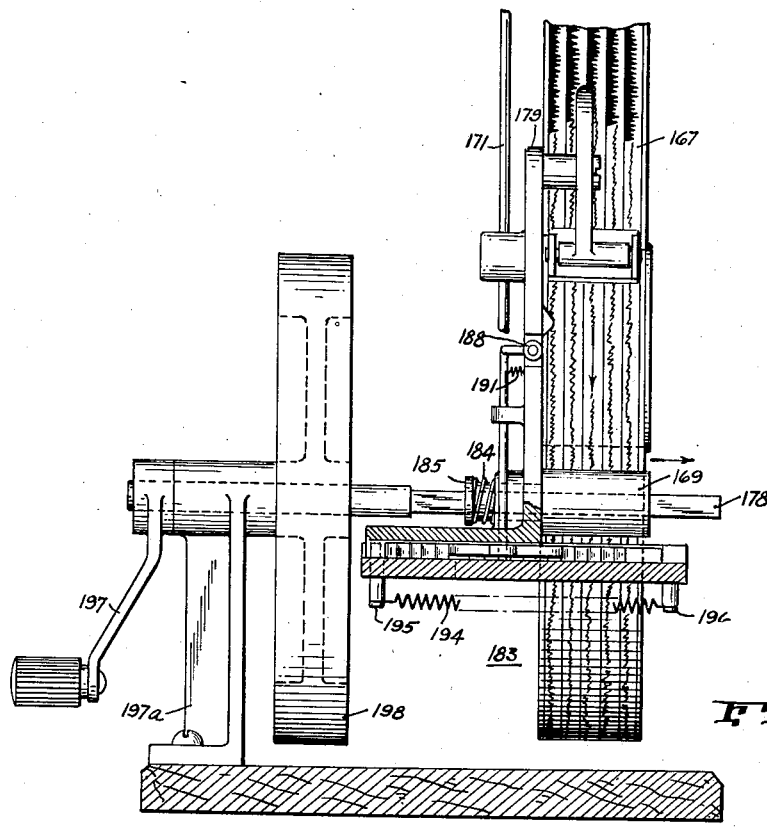
Figure 26:
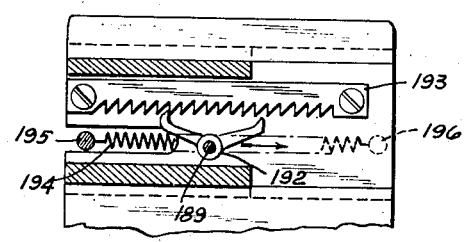

Figure 23 is an end view of a modified sound reproducing apparatus of simplified construction and hand operated; Figure 24 is a partial plan view of the apparatus of Figure 23; Figure 25 is a cross-sectional view taken along 25—25 of Figure 23; Figure 26 is a cross-sectional view taken along 26—26 of Figure 23 to illustrate details of the film shifting mechanism.

Figure 27 is a partial illustration of a modified form of sound strip having sound tracks arranged at an angle to the strip; Figure 28 illustrates an endless belt made of the sound strip of Figure 27 with the sound tracks forming a helix; Figure 29 illustrates a modification of the apparatus illustrated in Figure 23, corresponding to the section of Figure 25, but adapted to continuously scan the sound strip of Figure 27 without shifting operations; Figure 30 is an end view corresponding to 30—30 of Figure 29.

Figure 33:
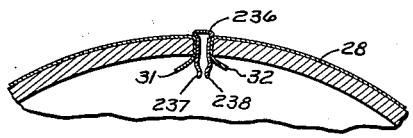
Figure 32:
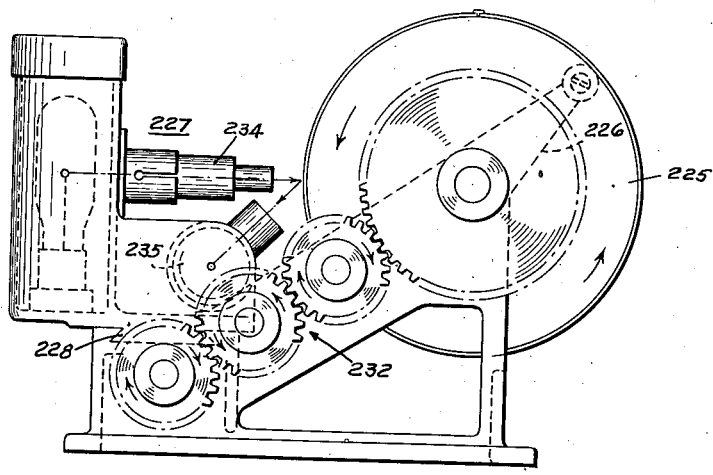
Figure 31:
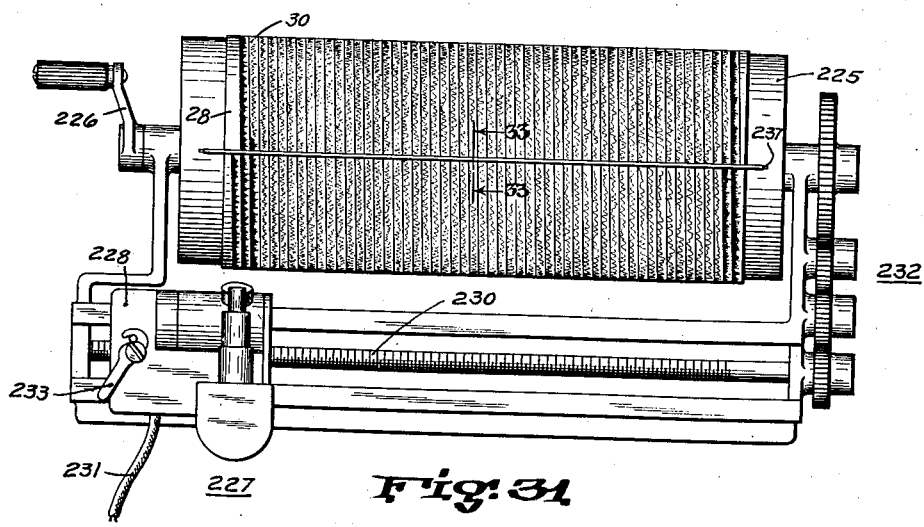

Figure 31 is an elevational view of a sound reproducing device for use with the sound sheet corresponding to Figures 7 and 8; Figure 32 is an end view of the apparatus of Figure 31; Figure 33 is an enlarged partial cross-sectional view taken along 33—33 of Figure 31 to illustrate the mounting of the record sheet.

The sound strips described herein contain a plurality of sound tracks arranged in adjacent and parallel relation between the parallel borders of the strip. The original sound record may be formed by any well-known photographic sound recording process. Although variable density recording may be used, I prefer to employ variable area recording for simplicity in reproduction by ordinary newspaper machinery. The parallel sound tracks may be formed by superimposing a plurality of recorded strips upon the wider strip to be printed. However, I prefer to record with apparatus similar to the sound reproducing mechanism to be hereinafter described, wherein track shifting means is provided so that recording operations are merely the inverse of the reproducing steps. The particular advantage of variable area recording resides in that a black-white zinc plate may be used for printing and the reproduction from newspaper printing is more accurate, resulting in better quality of sound.

The records corresponding to speech may be limited to a reproduction frequency of about 2200 to about 2500 cycles so that a relatively slower speed for feeding the tracks may be used. I have found that a linear feed rate of twenty-five to thirty feet per second gives excellent results for speech. My present invention, however, is not to be considered as limited to this speed range since lower or higher speeds are equally feasible.

I consider the most advantageous application of my present invention to newspaper features where inexpensive sound records are made available to the public in connection with news, featured articles or comic strips. Figure 1 illustrates the application of my present invention to a Sunday comic sheet. However, daily comic sheets or features may equally well be substituted. Sheet 10 is rectangular in form and has printed thereon a plurality of drawings 11 successively depicting the action of a comic character or feature. The drawings 11 contain balloons 12 in which reading matter corresponding to the speech of the comic characters appears. The reading matter is generally difficult for youngsters to either read or interpret. My invention overcomes the necessity for assistance from older folk by providing a sound record printed upon the sheet together with the comic feature. By reproducing the sound record with simple apparatus the child is told the story of the comic drawings in simple language.

I prefer to arrange the sound record near the long edge 13 of the rectangular sheet 10 in the form of a sound strip 14 containing a plurality of adjacent and parallel sound tracks 15. For simplicity in the drawings, I only illustrated five tracks 15. However, it is to be understood that more tracks may be used. These tracks need only be one-eighth of an inch in width for good quality sound reproduction. A narrow strip may readily contain eight or twelve parallel tracks. However, it is preferable to standardize the width of the strip 14 as well as the width and number of tracks 15 upon strip 14 in order that a uniform sound reproducing apparatus may be sold to operate with these printed records.

The sound strip 14 is printed upon sheet 10 simultaneously with the printing of the pictures or drawings 11. The original sound record is formed as a negative upon a zinc plate. The plate is arranged together with the plates for the drawings 11 in the preparation of the platen for printing the sheet 10 in a manner well known in the newspaper printing art. An important feature of the sound record of my present invention is the provision of perforations 16 and 17 to accurately predetermine the boundary edges of the strip 14. The perforations 16 need not penetrate through the sheet 10 but may merely be indentations in the sheet formed by raised portions of the platen. The perforation or score lines 16 and 17 facilitate removal of the sound strip 14 from the newspaper page 10.

Figure 2 illustrates the sound strip 14 severed from the newspaper sheet 10. A dark portion 18 is formed at one end of the strip 14. An endless band is formed of the strip 14 by pasting the end 19 of strip 14 on top of the dark portion 18. The parallel sound tracks 15 are accordingly joined into continuous parallel adjacent sound tracks. A notch 20 printed upon strip 14 is cut out as illustrated. Notch 20 actuates the track shifting mechanism to be hereinafter described for automatically and successively scanning the adjacent sound tracks.

The single sound strip 14 contains a story sufficient to explain the antics of the comic feature 11 with which it is associated. This modification of single strip representation requires a separate sound strip corresponding to strip 14 to be printed with each comic feature. The feature or story which the youngster desires to reproduce is individually severed from the corresponding sheet and formed into a band illustrated in Figure 3.

A modification of single strip recording is to provide a special page 21, such as illustrated in Figure 4, upon which a plurality of sound strips 22 are printed corresponding to all the comics in the newspaper. The length of the story depends upon the number of strips 22 provided. It is evident that the feature strips 22 may be used to relate special features or stories for the youngsters besides describing the comic features.

Figure 5 illustrates how the strips 22 are attached to form a long strip 23 of the individual strips 22 printed on sheet 21. The darkened portions 24 at the beginning of each strip are pasted beneath the end of the preceding strip as illustrated in Figure 5 so that the contiguous ends of the sound strips 22 form continuous individual sound tracks. A notch 25 is cut into the end of the long sound strip 23 for a purpose similar to that of notch 20.

Figure 6 illustrates a preferred arrangement for utilizing the sound record 23 by forming an endless strip 26. The strip 26 contains folds 27 so that a long strip 23 may be arranged in a compact form in a reproducing apparatus.

A modified arrangement for newspaper sound record supplements is illustrated in Figure 7 where a relatively wide sound section 28 is printed upon page 29 containing parallel sound tracks 30 arranged at an angle to the edges of the sheet 29. The angle of the sound tracks 30 is designed so that when the sound sheet 28 is severed from page 29, the contiguous ends of the tracks form a continuous helix. Figure 8 schematically illustrates how the sound sheet 28 is arranged in a cylindrical form so that the sound tracks 30 form a helix. I prefer to provide two dark areas 31 and 32 on opposite edges of the sound sheet 28 to facilitate mounting of the sheet upon a drum of the reproducing apparatus therefor. Suitable apparatus for reproducing the sound sheet 28 is illustrated in Figures 31 to 33.

Figures 9 to 13 illustrate a preferred embodiment of a mechanism for reproducing endless sound record 23 of Figures 4, 5, and 6. The record 23 is inserted in the machine around guide 33 between friction rollers 34 and 35, through magazine 44 and around guide pulley 36. A shoe 37 is mechanically biased by spring 38 against strip 23 in guide 33.

The length of the record strip 23 is immaterial. It is folded up with folds 27 within magazine 44; entering at the inlet 39 and passing through the outlet 40 of the magazine 44. Friction roller 35 is driven by fly-wheel 70 at a constant speed. Follower 34 is mechanically biased toward drive roller 35 by spring 41 operating on a pivoted lever 42 supporting roller 34. The strip 23 is accordingly firmly pressed against drive roller 35 and pushed into magazine 44 and drawn at a constant speed past the scanning apparatus 43.

The scanning apparatus 43 comprises an exciter lamp 45 containing a filament 46 which is electrically heated to an intense light source. The light from filament 46 is condensed by suitable lenses through a rectangular slot 47 and focused in a narrow rectangular beam upon a single sound track of sound strip 23. The rectangular slot 47 is preferably .002 of an inch in width and of length equal to the length of the sound track preferably one-eighth of an inch. The intense narrow light beam impinging upon the sound track of record 23 is refracted therefrom and is focused upon a photoelectric cell 48 by a suitable lens system 49.

I have found that it is advisable to arrange the light beam to impinge perpendicularly upon sound strip 23 to avoid reflected light from affecting the photoelectric cell 48. The light entering the photoelectric cell 48 is accordingly substantially all refracted light and no reflected light. The refracted light intensity varies in accordance with the corresponding sound variations in a manner well known in the art. The output of the photoelectric cell is connected to an audio frequency pre-amplifier (not shown) to generate electrical currents varying directly in accordance with the refracted light intensity. These electric currents are used to reproduce the sounds originally recorded upon sound tracks in a manner to be hereinafter described in more detail in connection with Figure 14.

When the first sound track of the endless strip 23 has been scanned by the scanner 43, means are provided for automatically shifting the scanner 43 opposite the next adjacent track so that the scanning operation continues on the second sound track at the proper time.

The scanner 43 is mounted upon a bed plate 50 which is movable step by step by the shifting apparatus 51 in a manner to be described in connection with Figure 11. The shifting apparatus 51 is controlled by electrical relay operated by a relay switch 52 positioned opposite the scanner beam.

Figure 10 is a cross-sectional view across 10—10 of Figure 9 showing the shifter relay switch 52 in cooperation with the sound record 23. Switch 52 contains a blade 53 extending against the edge of guide 33 and the corresponding side of record 23. Switch 52 illustrated in circuit closing position corresponds to the actuated position when switch blade 53 is opposite the notch 25 of strip 23.

Figure 11 is a partial cross-sectional view taken along 11—11 of Figure 9 illustrating further details of the shifter arrangement. The movable scanner bed 50 is guided by a dovetail extension 54 in the frame 55 enclosing the shifter mechanism 51. A rack 56 projects from the bed 50 and engages a pivoted double pawl 57. The scanner bed 50 is mechanically biased toward the right by a pusher rod 58 and a compression spring 59. The bed 50 is held against movement by the engagement of rack 56 with an arm of pawl 57. The armature portion 60 of pawl 57 is normally drawn away from the relay 61 by a biasing spring 62. The arm 63 of double pawl 57 accordingly engages a tooth of rack 56 to prevent movement of the scanner bed 50. When the switch 52 is closed in response to the notch being positioned opposite the scanner beam, the circuit containing an electromotive force or battery 64 and the relay 61 is closed and armature 60 of pawl 57 is attracted thereto against the action of spring 62. The attracted position is illustrated in Figure 11, showing pawl arm 63 removed from rack 56 and the opposite arm 65 engaged with a tooth of rack 56. The operation of the rack 56 and double pawl 57 is equivalent to an escapement mechanism whereby an electrical impulse permits a single tooth displacement of the scanner bed 50 due to the biasing spring 59 continuously acting thereon. When the electrical impulse is over the spring 62 draws armature 60 away from relay 61 simultaneously removing pawl arm 65 and engaging pawl arm 63 with the rack 56.

The scanner mechanism 43 is accordingly shifted for a distance equal to one tooth of rack 56 which is equal to the distance between the sound tracks on sound strip 23. Since the shifting operation occurs at a predetermined position corresponding to the beginning-ending portion of the endless sound strip, the next adjacent sound strip will be brought into scanning relation and the sound continuity will not be materially interrupted between the sound tracks as will now be evident. The drive roller 35 is driven by shaft 66 mounted in bearings 67 and 68. Fly-wheel 70 is secured to drive shaft 66 to smooth any irregularities of motion transmitted to the drive roller 35 and the sound strip 23.

Figure 12 is a plan view of the sound reproducing apparatus illustrated in Figures 9, 10, and 11, more clearly illustrating the drive mechanism. The apparatus is mounted on a baseboard 71. An electric motor 72 preferably a synchronous motor, is connected to a source of electrical energy by leads 73. The speed of motor 72 may be 1200 or 1800 revolutions per minute. A pulley 75 is secured to motor shaft 74 and is belted to a larger pulley 76 by belt 77. The larger pulley 76 directly drives fly-wheel 70 through an elastic coupling 78. The elastic coupling filters out surges or other irregularities in film feeding as will be understood by those skilled in the art.

Figure 13 is a cross-sectional view taken along 13—13 of Figure 12, illustrating a preferred form of elastic coupling 78. Coupling 78 consists of a plurality of leaf springs 80 symmetrically arranged about a block 81 rotatably mounted on drive shaft 66. Block 81 is rigidly secured to the hub of pulley 76 and is accordingly directly driven by motor 72 at a reduced speed ratio equal to the diametrical ratios between pulleys 74 and 76. Lever springs 80 are suitably mounted about the periphery of block 81. The projecting ends of leaf springs 80 are set into corresponding pairs of adjacent pins 82 projecting from fly wheel 70. Fly-wheel 70 is accordingly rotated by the coupling between leaf springs 80 and the driven block 81. Irregularities in speed are filtered by the elastic or compliant action of springs 80.

Figure 14 is a diagrammatic illustration of a modified form of the sound reproducing apparatus illustrated in Figures 9 to 13, further showing the preferred electrical circuit arrangement therefor. The synchronous motor 70 is connected to an electrical outlet plug 83 by conductor 73. The motor shaft 74 is connected to fly-wheel 70 by reduction gearing schematically shown by 84. The drive shaft 66' is directly connected to drive roller 35 which co-acts with a follower not shown, behind roller 35 to feed sound strip 23 at a constant speed by friction. In this modification, the sound record 23 is shifted and the scanner mechanism 43 is stationary. Accordingly, the cross section of drive shaft 66' is square so that the drive roller 35 may be moved along the shaft 66' while maintaining a driving connection thereto.

An annular groove 85 is cut into the supported end of drive roller 35 and set into a support plate 86. Guide 87 accurately guides the record strip 23 past the scanning mechanism 43. Due to the perforations defining the parallel edges of the record strip 23, the positions of the sound tracks 22' are accurately predetermined since their distance from the scored or perforated edges of the strip 23 are also predetermined, as described in connection with Figures 1 and 2 hereinabove. Guide 87 is also supported upon plate 86. A transverse movement of plate 86 will carry the drive roller 35, follower (not shown), guide 87 and the record strip 23 transverse to the scanning beam.

The shifting of the strip 23 and the associated feeding mechanism is accomplished by the shifting mechanism 51. The rack 56 is integrally connected with the support plate 86, by member 88. The teeth of rack 56 coact with the pivoted double pawl 57 to form a step-by-step escapement. The rack 56 is mechanically biased toward the right by biasing spring 59'. The escapement mechanism is actuated by relay magnet 61 operating on armature 60 connected to pawl 57. The shifter relay circuit is similar to the above described circuit bearing the same numerals, and comprises the switch lever 53, switch 52 and electromotive force 64. The notch 25 set on one side of the record strip 23 at the beginning-end section 23a permits the switch lever 53 to be moved by spring 53' to close the relay 61 circuit so that armature 60 will be attracted and subsequently released to permit the sound strip 23 to be shifted to the right by distance equal to the width of a sound track 22'. The shifting operation, accordingly, permits the scanning of the sound tracks to continue on the next adjacent sound track (to the left) at the moment notch 25 reaches the follower 53a on switch arm 53 as will now be evident and the beam passes the boundary 23a.

The scanner 43 of this modification is stationary and the sound strip 23 is shifted. A stationary position of the sensitive photoelectric cell 48 and the light beam is a quieter method of performing the track shifting continuity as compared to the modification of Figures 9 to 13 where the electro-optical system is shifted. Shifting of the electro-optical system invariably means a thump or noise due to the inherent jarring thereof whereas shifting of the sound strip is accompanied by negligible noise. The filament 46 of the exciter lamp 45 is preferably heated by a step-down transformer 90 connected by leads 91 to the outlet plug 83 when an alternating current source is used. It is to be understood that my present invention is not limited to alternating current in application, but direct current energy for driving the motor 70 and operating the lamp 45 and amplifier equipment may be used.

I prefer to include a pre-amplifier 92 directly connected to the photo-electric cell 48 circuit to amplify the low intensity current variations of the cell 48 to an appreciable value at the output 93 of amplifier 92. The electrical output 93 of amplifier 92 is an audio frequency corresponding to the sound to be reproduced from the record being scanned as will be understood by those skilled in the art. The output 93 is preferably connected to a telephone plug 94 for insertion into a jack connected to a suitable audio frequency amplifying outfit. Audio frequency amplifier 95 is shown having a jack 96 connected to the input thereof so that the insert of plug 94 into jack 96 will connect the output 93 of pre-amplifier 92 to the audio amplifier section 95. The output of audio frequency amplifier 95 is connected to a loud speaker 97 for acoustic reproduction of the sound record. Although the audio frequency amplifier 95 and loud speaker 97 may be made integral with the recording apparatus, and sold as a unitary structure, it is preferable to manufacture them separately so that a home radio broadcast receiver such as receiver 98 may be employed to save the expense of the amplifier 95 and speaker 97. A simple jack 99 connection to the audio frequency section of the receiver 98, well known to those skilled in the radio art, provides a means for simply connecting the output of pre-amplifier 92 to the receiver 98 by the telephone plug 94. The connection between the pre-amplifier 92 and the radio receiver 98 may be made at the phonograph input connections which most modern radio receivers provide.

The sound strips described in connection with Figures 1 to 8 and employed in the recording apparatus hereinabove described, may be sold to the public in inexpensive book or magazine form, particularly useful for educational and amusement features for children. Geography, history and fiction may be readily conveyed in an interesting manner to children having the sound recording apparatus which they could also use for the daily and Sunday comic sections provided by the newspaper. Whole stories may be cut out and pasted together in sound record form for the enjoyment and entertainment of the youngsters. When lengthy stories or books are to be recorded by the printed, opaque sound strips of my present invention, it is preferable to use a long reel sold in reel form ready for insertion in suitable recording apparatus to be hereinafter described. This reel may preferably have sprocket perforations adjacent the edges for positive feeding through the apparatus similar to moving picture film. However, frictional feeding as herein described is entirely feasible. The talking book is particularly useful for blind people who may readily learn to operate the recording apparatus unaided.

Figures 15 to 22 illustrate a modified form of the sound reproducing apparatus employing a long sound record reel. This modification employs sprocket feeding for the sound strip 100 which contains square holes 101 to coact with the sprocket drive roller 102. When one end of the reel is reached, means are provided for automatically reversing the direction of feed of the sound strip 100 and simultaneously shifting the strip so that the next adjacent sound track will be opposite the scanning mechanism for continuing the sound reproduction.

Referring to Figure 15, the sound strip 100 is shown rolled up in a reel 103 on the lower spool 104. The position illustrated is when the upper reel spool 105 has been unwound and the feed direction is about to be reversed. The sound strip 100 is threaded about drive sprocket roller 102 between idler roller 106 and 107 and around guide drum 108. The scanner mechanism 110 is similar to the scanner mechanism 43 hereinabove described and comprises an exciter lamp 111 and photo-electric cell 112 focused upon the sound strip 100. In this modification, the track shifting mechanism 113 is designed to shift the strip 100 and its associated feeding mechanism in response to the shifting impulse in a manner to be hereinafter described.

Figure 16 is a partial plan view of this modification. The apparatus is mounted on a cast iron base 114 and is driven by an electric motor 115 preferably of the synchronous type. The motor 115 drives the pulley 116 and belt 117. Pulley 116 in turn drives the differentially arranged bevel gears 118—119—120. Fly-wheels 121 and 122 are accordingly continuously rotated in opposite directions. I prefer to employ this double fly-wheel arrangement for reversibly driving the sound strip 100 in order to secure an efficient and rapid reversal in response to the impulse therefor.

Figure 17 is a cross-sectional view taken along 17—17 of Figure 16, to more clearly illustrate the film reversal drive arrangement. Fly-wheels 121 and 122 are respectively keyed to sleeves 123 and 124. Sleeves 123 and 124 are rotatably mounted on shaft 125. Bevel gear 119 is rotatably mounted on sleeve 123 and is compliantly keyed to fly-wheel 122 by a leaf spring connection 126 similar to the connection 78 hereinabove described in connection with Figure 13. Bevel gear 120 is similarly rotatably mounted on sleeve 124 and connected to fly-wheel 122 by a leaf spring connection 127.

A positive clutch 128 is located between the bevelled gears 119 and 120 to selectively engage and be driven by either one in response to record reversing impulses to be described. The positive clutch 128 is slidably keyed by feather keys 130 to shaft 125. Clutch member 128 is rotatably mounted at an end of lever 133 in yoke 134 so that it is free to be rotated with respect to lever 133 and also move into engagement with bevel gear 119 or 120. The hub of bevel gears 119 and 120 respectively contain teeth 131 and 132 for coacting with the corresponding teeth of clutch member 128. The illustrations show clutch member 128 engaged with bevelled gear 120 so that the shaft 125 is positively driven by bevel gear 120 in the corresponding direction of rotation.

A drive shaft 125 is connected to pulleys 134 and 135 which selectively drive the reel spools 104 and 105. Pulleys 134 and 135 are connected to shaft 125 by a simple clutch arrangement which maintains a positive driving connection with one pulley when shaft 125 turns in one direction, being free of the other; and when shaft 125 reverses its direction of rotation, the idle pulley will be engaged and the other pulley will become disengaged. Figure 22 is an enlarged cross-sectional view through pulley 135 showing pins 139 and biasing springs 139' on opposite sides of a head 138 projecting from shaft 125. The springs 139' mechanically bias the pins or rollers 139 to a wider space so that the pulley becomes disengaged when the shaft 125 rotates clockwise. However, when shaft 125 rotates counterclockwise, the pins 136 positively grip the inner surface of pulley 135 and shaft 125 to rotate the pulley. Pulley 134 is similar to 135 except that it will engage and disengage for opposite rotations of shaft 125.

Pulley 134 drives lower spool 104 by means of a flexible belt 136. Belt 136 is preferably a wire belt to permit slippage between the drive pulley 134 and the driven pulley 140. The slippage is required when reverse rotation of the feeding takes place and the spool is suddenly forced to drive in an opposite direction as will be explained. The upper spool 105 is similarly driven by flexible belt 137 connected to drive pulley 135. Accordingly, when shaft 125 is rotated in one direction, a corresponding spool is engaged and rotated to wind-up a reel of the sound strip 100 in a direction corresponding to the feeding direction imparted to the strip 100 by the sprocket drive roller 102. When a reversal impulse shifts the clutch 128 to the opposite drive direction, the rotation of shaft 125 is immediately reversed and the drive pulley previously engaged becomes disengaged, and the second drive pulley becomes engaged to rotate the opposite reel for winding-up the sound strip 100.

The film 100 is positively driven by the sprocket roller 102, the respective reels 104 and 105 serving to wind-up the film in a reel 103 for suitable handling or transportation thereof. Any differential speed between the reel 103 as being wound by the corresponding spool, and the strip 100 at the drive sprocket 102, is taken up or compensated by the slippage referred to at the flexible belting 136 and 137. The sprocket roller 102 is connected to drive rod 125 by a splined extension 141. Sprocket roller 102 is pinned to a rod 142 having an extension 143 co-acting with the splined extension 141. The splined relation between shaft 125 and sprocket roller 102 permits a positive rotative action therebetween and also permits a transverse shifting of the sprocket and feed mechanism for the film 100 in response to a shifting impulse to be described.

The rod 142 supporting sprocket roller 102 is mounted in a plate member 144 supported on a movable bed 145. The step by step shifting mechanism 113 is similar in construction to the escapement mechanism 51 hereinabove described in connection with Figures 9 through 13. The double pawl 146 engages the rack 147 attached to the bottom of bed 145. A spring 148 presses against a pin 150 attached to the plate 144. Plate 144 is, accordingly, mechanically biased to the right by spring 148 and normally held against movement by the escapement mechanism 113. An electrical impulse sent through magnet 151 from battery 152 attracts armature 153 of pawl 146 against the action of spring 154 to permit the bed plate 145 to move a distance equal to one tooth of rack 147. The movement of bed 145 to the right carries with it the sprocket roller 102 and associated follower or presser rollers 106 and 107 and the guide drum 108. The drive connection of sprocket roller 102 and shaft 125 is uninterrupted at the splined connection. The record strip 100 is, accordingly, shifted to the right by a distance equal to the width between the sound tracks printed thereon so that the next adjacent sound track is moved into position opposite the scanner means 110.

The shifting impulse is imparted by a predetermined portion of the sound strip 100 near each end of the strip. I have illustrated the simple notch 156 and 156' near opposite ends of the record strip 100 to effect the shifting and reversal impulses. A relay switch 157 operates the electrical circuit for providing the electrical impulses. A blade 158 of switch 157 contains a follower 159 which continually acts against one edge of the sound strip 100. In the illustrated position sound strip 100 has been traveling toward the left and notch 156 has reached the position opposite follower 159 to permit relay switch 157 to close the circuit including battery 152. When the relay 157 is closed an electrical impulse flows through relay 151 to attract armature 153 and effect a single step escapement or shifting of the sound strip 100; an electrical impulse simultaneously also flows through relay 160 of the feed reversal mechanism. Relays 151 and 160 are connected in series with battery 152 and switch 157.

The reversal mechanism is controlled by a lever 133 which contains the double armature arrangement 161 and 162. Armature 161 is attracted to the relay 160 so that positive clutch 128 is thrown into engagement with bevel gear 120. Figure 17 illustrates the mechanism at the time of reversal of movement and shifting of sound strip 100 in response to the notch 156 action on switch follower 159. I have preferred to use a snap switch or lever arrangement 163 at the end of lever 133 in order to effect a substantially instantaneous reversal at clutch 128.

When the sound strip reaches the opposite end and notch 156' comes in position near the switch followers, the mechanism is prepared to reverse the feeding direction and shift the strip one more step to the right. I prefer to employ a second relay switch 164 having an independent follower 165 spaced from the first follower 159. The distance between switch followers 159 and 165 is designed so that the reversal of feeding will occur before the notch 156 can pass from one follower to the next. In other words, the distance between the switch followers is designed to effect the actuation of both switches 157 and 164 by either of the notches 156 or 156'. Accordingly, notch 156' will actuate switch follower 165 when the left end portion of the film strip passes in front of the scanning means 110. When switch 164 is closed relay 151 effects a step of shifting at the escapement mechanism 113 and relay 166 attracts armature 162 to engage positive clutch 128 with the bevel gear 119 to substantially instantaneously reverse the direction of rotation of shaft 125. The sound strip 100 will then continue to be scanned in the same direction as the original motion described, with the third track being scanned instead of the first. The cycle of reversal of feed and shifting is similarly repeated as the strip is fed in front of the scanning mechanism 110 between notches 156 and 156'. The position of notches 156 and 156' upon strip 100 is predetermined with respect to the position of followers 159 and 165 on the guide drum 108, and the position of the edge of the sound tracks on the strip 100.

Figure 18 is a cross-sectional view taken along 18—18 on Figure 16, being an elevation of the relay switches 157 and 164 and the guide drum 108.

A modified arrangement of the switch followers 159 and 165 is illustrated in Figures 19 and 20. Notches 156a and 156a' are placed on opposite sides of the strip 100. The switch followers 159 and 165 are placed in opposed relation along opposite edges of strip 100. The reversal of strip 100 need not be performed in the very short interval necessary for proper operation of the modification shown in Figures 17 and 18 and, accordingly, the notches 156a and 156a' are shown longer than the corresponding notches 156 and 156'. Each notch can only actuate its associated relay. The electrical actions and functions of the relays illustrated in Figures 19 and 20 are identical to those illustrated in Figures 17 and 18.

The design of the sound reproducing apparatus illustrated in Figures 23 to 26 is simplified to reduce the expense in manufacturing and assembling the component parts. A manual drive is substituted for the electric motor. A mechanical shifting arrangement, directly actuated by the predetermined portion of the sound strip controls the step-by-step escapement or shifting means instead of the electrical relay arrangement hereinabove described.

The sound strip 167 is joined to form an endless strip similar to the strip 23 of Figure 6. Strip 167 is inserted about guide member 168, between drive roller 169 and follower 170, looped around the adjustable wire support 171 and held in position by shoe 172 mechanically biased against a portion of guide member 168 by spring 173. The position of wire 171 is adjustable in bracket 174 and fastened by thumb screw 175 therein. The sound strip 167 is fed past the scanning mechanism 177 by frictional engagement of the drive roller 169 and follower 170. Drive roller 169 is preferably mounted on a square shaft 178 to permit the shifting of the sound strip 167 and associated feeding mechanism in response to the mechanical shifting operation.

The strip feeding members are supported upon upright 179 which extends from bed plate 180. Bed plate 180 contains a dovetail slide 181 engaging with a corresponding groove in bracket 182. The strip feeding mechanism is accordingly movable on supporting bracket 182 transverse to the stationary scanning system 177.

Figure 25 is the partial cross-sectional view taken along 25—25 of Figure 23 to more clearly illustrate details of the shifting means 183. The drive roller 169 is slidably mounted on square shaft 178 and rotatably supported in upright 179. An extension of roller 169 projects beyond upright 179. A spring 184 is placed between the head 185 of roller 169 extension and the upright 179 to accurately maintain the relative position between the roller 169 and the shifting mechanism. Drive roller 169 is moved transverse to the scanning direction slidably upon the square shaft 178. The notch 187 formed at a predetermined portion of sound strip 167 permits the follower 188 to be displaced from its normal position and in turn actuate the shifter escapement mechanism 173.

Follower 188 is mounted at one end of the actuating lever 189. Lever 189 is supported upon gear 190 on upright 179. A compound curve is formed at the end of lever 189 containing the follower 188 so that when follower 188 is depressed when notch 187 reaches it, a twist of the body of rod 189 occurs. A spring 191 mechanically biases one section of the compound curved portion of lever 189 to effect a twist of the lever when notch 187 is reached.

The opposite end of lever 189 is secured to a double pawl 192 most clearly illustrated in Figure 26. The double pawl 192 engages the rack 193 secured to the bottom of the bed plate 180. A spring 194 connects two pins 195—196 projecting from the bed plate 180 and bracket 182 respectively. Spring 194 accordingly mechanically biases bed plate 180 and the strip feeding mechanism toward the right. The escapement members consist primarily of double pawl 192 and rack 193 maintains the strip feeding mechanism in stationary relationship with respect to the scanning means 177 and permits a shift of the strip to the right when the follower 188 engages with notch 187 as will now be evident.

The square shaft 178 is directly connected to the hand lever 197 and is supported by a bracket 197a. A fly-wheel 198 is pinned to the square shaft 178 to steady any fluctuations in the driving effort.

The pre-amplifier is preferably located within the supporting structure for the scanner mechanism 177. The pre-amplifier 199 is schematically indicated in Figure 23 as comprising two amplifier tubes mounted on a sub-panel. The pre-amplifier section 199 is adjacent the photo-electric cell which collects the refracted light in a manner hereinabove described.

Figures 27 to 30 inclusive relate to a modified form of my present invention wherein the step-by-step shifting operation is eliminated. The sound record of this modification consists of a plurality of sound tracks 200 arranged at an angle to the edge of the carrier sheet 201 and sides 202 of the record strip 203.

Figure 27 is an enlarged partial illustration of such a record strip, corresponding to the single strip 14 described in connection with Figures 1, 2, and 3. The sound strip 203 is severed from the sheet carrier 201 in a similar manner. The length of strip 203 is predetermined so that when formed into an endless strip by securing end 204 beneath the opposite end of the strip, the sound tracks will form a continuous helix. Figure 28 illustrates the endless form into which sound strip 203 is made. The beginning-ending section 205 of the band 203 joins the parallel sound tracks 200 into a continuous single helical sound track. No notch or other shifter actuating means need be employed in this modification.

The sound recording device of this modification is similar to the mechanism illustrated in Figures 23 to 26 hereinabove. Figure 29 corresponds to the view of Figure 25 of the preceding modification. The hand lever 206 is used to rotate flywheel 207 and square shaft 208. The drive roller 210 is mounted upon upright 211 in a manner similar to the mounting of the roller 169.

The strip feeding mechanism, mounted upon upright 211, is fed at a constant rate transverse to the scanning mechanism (not shown). A pinion 212 is mounted on the drive shaft 208 for motivating the feed screw 213. Feed screw 213 is connected to a gear 214 connected with pinion 212. An extension of bed plate 215 coacts with the threaded portion of feed screw 213. Bed 215 rides in a dove-tailed bracket support 216. The transverse movement of bed plate 215 carries with it the upright 211 of the strip feeding mechanism. The rate of feed of the strip 203 across the scanning beam is predetermined in accordance with the pitch of the helical arrangement of the sound tracks 200. Figure 30 is an end view of the upright 211 coacting with the bracket 216.

A further modification for a simple inexpensive sound recording mechanism useful for printed sound records is illustrated in Figures 31 to 33. This modification is used in conjunction with the sound sheet 28 hereinabove described in connection with Figures 7 and 8. The sound sheet 28 is mounted upon a cylindrical drum 225 so that the opposite ends of the tracks 30 are placed in proper position to form a continuous spiral or helix of the sound record. This simplified mechanism may be driven by a hand lever 226. The mass of the drum 225 serves the purpose of a fly-wheel for steadying the rotative efforts of the operator. It is to be understood that an electric motor drive may be employed for this modification.

The sheet 20 is a predetermined size to smoothly fit upon the surface of drum 225. The electro-optical scanning means 227 is mounted on a dove-tailed slide 228 and driven at a predetermined rate parallel to the axis of the drum 225 by feed screw 230. The electrical connections to the electro-optical scanners 227 are made by a flexible cable 231. Reduction gearing 232 connects the drum 225 with the feed screw 230 to maintain a predetermined rate of scanning between the rotation of drum 225 and the electro-optical system 227. The scanner 227 accordingly follows the helical arrangement of the tracks 230 and translates the varying shading of the tracks to correspondingly vary electrical audio frequency currents. The position of scanner mechanism 227 is adjustable along feed screw 230 by means of a lever 233 operating on an engaging and disengaging connection between the base of scanner 227 and feed screw 230 which is not illustrated.

Figure 32 is an end view of the drum sound reproducer illustrating the relation of the scanner 227 with the drum 225. The light beam emanates from the lens system 234 perpendicular to the drum 225. The photoelectric call 235 collects a portion of the light refracted from the sound sheet 228 in a manner already described.

It is advisable that the sound sheet 227 be mounted upon drum 225 with a minimum "dead" portion. In my preferred illustration, I show a clip 236 insertable in a corresponding slot 237 of the drum 225. The clip 236 extends across the length of the slot and contains two opposed sides 237, 238 which are crimped and spring biased outwardly. The ends 31 and 32 of the sheet 28 correspond to the darkened regions illustrated in Figure 7, and are inserted into the slot 237 of the drum 225. The sheet is smoothed around the drum surface and the clip 236 is inserted into the slot to hold the sheet firmly in position by spring action against the edges of the slot. The width of clip 236 is made as narrow as feasible. The outer surface of clip 236 is blackened so as not to create a sound impulse when passing across the scanning beam.

Although I have described the sound sheet 28 containing the parallel lines 30 as being a portion of a newspaper, it is to be understood that these sheets may be sold in magazine form, removable by youngsters or blind individuals for reproduction upon the drum apparatus corresponding to the modification herein described in connection with Figures 31 to 33. The speed of rotation of the apparatus is readily determined by the operator after a few trials since the maintenance of the quality of the sound reproduction is the best indication of the correct speed. When a synchronous motor is used, the speed, however, automatically is maintained.

Although I have illustrated preferred forms which the sound records and reproducing apparatus therefor may take, it is to be understood that further modifications and changes may be made by those skilled in the art without departing from the broader spirit and scope of my present invention, and accordingly I do not intend to be limited except as set forth in the following claims.

I claim:

1. The combination with mechanism for feeding a strip containing a plurality of parallel sound tracks, of means for scanning said sound tracks for producing electrical currents corresponding to the sound to be reproduced comprising a source of light focused to a narrow beam directed upon a single sound track, photo-electric means for translating light from the strip into electrical currents, and means for acoustically transforming said currents; and means responsive to a notch on said strip for moving the next adjacent parallel sound track to a position opposite said scanning beam, including a device for shifting said strip feeding mechanism transverse to said scanning means step by step, the distance of each shifting operation being substantially equal to the distance between the sound tracks, said device comprising an escapement mechanism and a lever mechanically engageable with said strip and said escapement mechanism for actuating said escapement mechanism in response to said notch.

2. The combination with mechanism for feeding a strip containing a plurality of parallel sound tracks, of means for scanning said sound tracks for producing electrical currents corresponding to the sound to be reproduced; means responsive to a predetermined portion of said strip for moving the next adjacent parallel sound track to a position opposite said scanning means, including a device for shifting said strip feeding mechanism transverse to said scanning means comprising an escapement and means for releasing said escapement one step by said predetermined strip portion; and means for reversing the direction of feed of said strip whenever a strip shifting step is effected including a first and second clutch carrying an individual pulley for driving the strip from either end, a shaft, one of said clutches being mounted on said shaft to become engaged in one sense of rotation, the other of said clutches being mounted on said shaft to become engaged in the reverse sense of rotation, and means for reversing the rotation of said shaft for each strip shifting step comprising a first and second flywheel, means for simultaneously rotating said flywheels in opposite directions, and means for selectively engaging said shaft with either one of said flywheels whereby the corresponding clutch is engaged in accordance with the direction of rotation of the selected flywheel for reversibly driving said strip.

3. The combination with mechanism for feeding a strip containing a plurality of parallel sound tracks, of means for scanning said sound tracks for producing electrical currents corresponding to the sound to be reproduced; means responsive to a predetermined portion of said strip for moving the next adjacent parallel sound track to a position opposite said scanning means, including a device for shifting said strip feeding mechanism transverse to said scanning means; means for reversing the direction of feed of said strip whenever a strip shifting step is effected including a first and second clutch carrying an individual pulley for driving the strip from either end, a shaft, one of said clutches being mounted on said shaft to become engaged in one sense of rotation, the other of said clutches being mounted on said shaft to become engaged in the reverse sense of rotation; means for reversing the rotation of said shaft for each strip shifting step comprising a first and second flywheel rotatably mounted on said shaft; gearing means for rotating said flywheels in opposite directions on said shaft, and means for selectively engaging said shaft with one of said flywheels.

4. The combination with mechanism for feeding a strip having a plurality of parallel sound tracks of means for scanning said sound tracks for producing electrical currents corresponding to the sound to be reproduced; and means responsive to a predetermined portion of said strip for moving the next adjacent parallel sound track to a position in cooperative relation with said scanning means including a device for shifting said strip feeding mechanism transverse to said scanning means, said device comprising an escapement mechanism having a rack and a pawl, a rod connected to said pawl, one end of said rod being arranged to coact with said strip and actuate said pawl when contacting said predetermined strip portion to release said escapement mechanism one step.

5. The combination with mechanism for feeding a strip having a plurality of parallel sound tracks of means for scanning said sound tracks for producing electrical currents corresponding to the sound to be reproduced; and means responsive to a predetermined notch portion of said strip for moving the next adjacent sound track to a position in cooperative relation with said scanning means including a device for shifting said strip feeding mechanism transverse to said scanning means, said device comprising an escapement mechanism, a rod mechanically connected with said escapement mechanism, one end of said rod being arranged to mechanically coact with said strip and to actuate said escapement mechanism when contacting said predetermined strip portion, said rod having a roller at said one end mechanically biased against an edge of said strip, said rod being formed with compound bends for twisting the other end thereof when said one end is depressed into said notch portion.

6. The combination with mechanism for feeding a strip having a plurality of parallel sound tracks of means for scanning said sound tracks for producing electrical currents corresponding to the sound to be reproduced; and means responsive to a predetermined notch portion of said strip for moving the next adjacent sound track to a position in cooperative relation with said scanning means including a device for shifting said strip feeding mechanism transverse to said scanning mean, said device comprising an escapement mechanism, a rod mechanically connected with said escapement mechanism, one end of said rod being arranged to mechanically coact with said strip and to actuate said escapement mechanism when contacting said predetermined strip portion, said rod having a roller at said one end mechanically biased against an edge of said strip, said rod being formed with compound bends for twisting the other end thereof when said one end is depressed into said notch portion, said escapement mechanism comprising a rack and a double pawl secured to said other rod end, a spring mechanically biasing said rack against said pawl, said pawl being motivated when said rod is twisted to release said escapement mechanism one step.

7. The combination with mechanism for feeding a strip having a plurality of parallel sound tracks of means for scanning said sound tracks for producing electrical currents corresponding to the sound to be reproduced; and means responsive to a predetermined portion of said strip for moving the next adjacent sound track to a position in cooperative relation with said scanning means including a device for shifting said strip feeding mechanism transverse to said scanning means, said device comprising an escapement mechanism, a rod mechanically connected with said escapement mechanism, one end of said rod being arranged to mechanically coact with said strip and to actuate said escapement mechanism when contacting said predetermined strip portion, said rod having a roller at said one end mechanically biased against an edge of said strip, said rod being formed with compound bends for twisting the other end thereof when said one end is depressed into said strip portion; a strip drive roller rotatably mounted with said scanning means, a non-circular drive shaft slidably engageable with said drive roller to permit driving thereof and mechanical displacement of the drive roller with said scanning mechanism.

8. The combination with mechanism for feeding a strip having a plurality of parallel sound tracks of means for scanning said sound tracks for producing electrical currents corresponding to the sound to be reproduced; and means responsive to a predetermined portion of said strip for causing the next adjacent sound track to be in the scanning position including a device having an escapement mechanism, a rod mechanically connected to said escapement mechanism, one end of said rod being arranged to mechanically coact with said strip and actuate said escapement mechanism when contacting said predetermined strip portion to release said escapement mechanism one step.

9. The combination with mechanism for feeding a strip having a plurality of parallel sound tracks of means for scanning said sound tracks for producing electrical currents corresponding to the sound to be reproduced; and means responsive to a predetermined notch portion of said strip for causing the next adjacent sound track to be in the scanning position including a device comprising an escapement mechanism having a rack and a pawl, a rod mechanically connected to said pawl, one end of said rod being arranged to mechanically coact with said strip and actuate said pawl when contacting said predetermined notch portion to release said escapement mechanism one step.

10. The combination with mechanism for feeding a strip having a plurality of parallel sound tracks of means for scanning said sound tracks for producing electrical currents corresponding to the sound to be reproduced; and means responsive to a predetermined notch portion of said strip for causing the next adjacent sound track to be in the scanning position including a device comprising an escapement mechanism having a rack and a pawl, a rod mechanically connected to said pawl, one end of said rod being arranged to mechanically coact with said strip and actuate said pawl when contacting said predetermined notch portion to release said escapement mechanism one step, said rod having a roller at said one end mechanically biased against an edge of said strip, said rod being formed with compound bends for twisting the other end thereof when said one end is depressed into said notch portion.

11. The combination with mechanism for feeding a strip having a plurality of parallel sound tracks of means for scanning said sound tracks for producing electrical currents corresponding to the sound to be reproduced; and means responsive to a predetermined notch portion of said strip for causing the next adjacent sound track to be in the scanning position including a device comprising an escapement mechanism having a rack and a pawl, a rod mechanically connected to said pawl, one end of said rod being arranged to mechanically coact with said strip and actuate said pawl when contacting said predetermined notch portion, said rod having a roller at said one end mechanically biased against an edge of said strip, said rod being formed with compound bends for twisting the other end thereof when said one end is depressed into said notch portion, said pawl having two opposed projections cooperating with said rack and being secured to said other rod end, said pawl being motivated when said rod is twisted to release said escapement mechanism one step.

12. The combination with mechanism for feeding a strip containing a plurality of parallel sound tracks, of means for scanning said sound tracks for producing electrical currents corresponding to the sound to be reproduced; means responsive to a predetermined portion of said strip for causing the next adjacent parallel sound track to be in the scanning position; and means for reversing the direction of feed of said strip whenever the next adjacent sound track is placed in scanning position including a first and second clutch carrying an individual pulley for driving the strip from either end, a shaft, one of said clutches being mounted on said shaft engageable in one sense of rotation, the other of said clutches being mounted on said shaft and being engageable in the reverse sense of rotation; and means for reversing the rotation of said shaft responsive to said predetermined strip portion comprising a first and second flywheel, means for simultaneously rotating said flywheels in opposite directions, and means for selectively engaging said shaft with either one of said flywheels whereby the corresponding clutch is engaged in accordance with the direction of rotation of the selected flywheel for reversibly driving said strip.

13. The combination with mechanism for feeding a strip containing a plurality of parallel sound tracks, of means for scanning said sound tracks for producing electrical currents corresponding to the sound to be reproduced; means responsive to a predetermined portion of said strip for causing the next adjacent parallel sound track to be in the scanning position; and means for reversing the direction of feed of said strip whenever the next adjacent sound track is placed in scanning position including a first and second clutch carrying an individual pulley for driving the strip from either end, a shaft, one of said clutches being mounted on said shaft engageable in one sense of rotation, the other of said clutches being mounted on said shaft and being engageable in the reverse sense of rotation; and means for reversing the rotation of said shaft responsive to said predetermined strip portion comprising a first and second flywheel rotatably mounted on said shaft; gearing means for rotating said flywheels in opposite directions on said shaft, and means for selectively engaging said shaft with one of said flywheels including a clutch member slidably secured to said shaft and engageable with coacting clutch portions on either of said flywheels.

14. The combination with mechanism for feeding a strip containing a plurality of parallel sound tracks, or means for scanning said sound tracks for producing electrical currents corresponding to the sound to be reproduced; means responsive to a predetermined portion of said strip for causing the next adjacent parallel sound track to be in the scanning position; and means for reversing the direction of feed of said strip whenever the next adjacent sound track is placed in scanning position including a first and second clutch carrying an individual pulley for driving the strip from either end, a shaft, one of said clutches being mounted on said shaft engageable in one sense of rotation, the other of said clutches being mounted on said shaft and being engageable in the reverse sense of rotation; and means for reversing the rotation of said shaft responsive to said predetermined strip portion comprising a first and second flywheel rotatably mounted on said shaft; gearing means for rotating said flywheels in opposite directions on said shaft, and means for selectively engaging said shaft with one of said flywheels including a clutch member slidably secured to said shaft and engageable with coacting clutch portions on either of said flywheels, a lever for controlling the engagement of said slidable clutch member, and electromagnetic means for actuating said lever in either direction.

15. The combination with mechanism for feeding a strip containing a plurality of parallel sound tracks, of means for scanning said sound tracks for producing electrical currents corresponding to the sound to be reproduced; means responsive to a predetermined portion of said strip for moving the next adjacent parallel sound track to a position opposite said scanning means, including a device for shifting said strip feeding mechanism transverse to said scanning means comprising an escapement and means for releasing said escapement one step by said predetermined strip portion including a solenoid and an armature therefor secured to said escapement mechanism; and means for reversing the direction of feed of said strip whenever a strip shifting step is effected including a first and second clutch carrying an individual pulley for driving the strip from either end, a shaft, one of said clutches being mounted on said shaft to become engaged in one sense of rotation, the other of said clutches being mounted on said shaft to become engaged in the reverse sense of rotation, and means for reversing the rotation of said shaft for each strip shifting step comprising a first and second flywheel rotatably mounted on said shaft; gearing means for rotating said flywheels in opposite directions on said shaft, and means for selectively engaging said shaft with one of said flywheels including a clutch member slidably secured to said shaft and engageable with coacting clutch portions on either of said flywheels, a lever for controlling the engagement of said slidable clutch member, and electromagnetic means for actuating said lever in either direction including a first and second electromagnet, and switching means individually in circuit with each of said electromagnets for motivating said lever in a predetermined direction in accordance with the direction of movement of said strip to cause reversed movement thereof.

WILLIAM G. H. FINCH.